Patented July 17, 1951

2,560,838

UNITED STATES PATENT OFFICE 2,560,838

PREPARATION OF FLUORINE COMPOUNDS

Robert Charles Arnold, Bryan, Ohio

No Drawing. Application January 24, 1947,
Serial No. 724,251

9 Claims. (Cl. 260—653)

This invention relates to the preparation of fluorine compounds and more particularly to using boron trifluoride as a catalyst to promote the addition of anhydrous hydrogen fluoride to olefinic compounds.

Organic fluorinated compounds have generally been prepared from organic chlorides or bromides by the exchange of fluorine for the chlorine or the bromine atoms. Symmetrically fluorinated compounds have been made by the addition of fluorine to an olefinic double bond. Some organic fluorine compounds have been prepared by the addition of anhydrous hydrogen fluoride to organic olefins and acetylenes. The latter method has heretofore been limited in its use, since many olefins do not react with anhydrous hydrogen fluoride to give an addition product. This method is further limited by the fact that certain olefins, known to give an addition product, do so only when heated to a relative high temperature and the resulting yield of the addition product is very low.

It is the object of this invention to provide a method for causing the addition of anhydrous hydrogen fluoride and certain halogenated acyclic olefins heretofore unaffected by anhydrous hydrogen fluoride alone. Another object is to provide a method for obtaining better yields of the addition products than can be obtained without a boron trifluoride catalyst. A further object is to provide a method for obtaining the addition products while carrying out the reactions at much lower temperatures than were formerly possible. Another object is to provide a less costly method for preparing certain fluorinated organic compounds. Still other objects will appear hereinafter.

The above and other objects may be accomplished in accordance with my invention by causing anhydrous hydrogen fluoride, in the presence of boron trifluoride, to react with a halogenated acyclic olefin in a manner similar to the method already used when operating with anhydrous hydrogen fluoride and an olefinic compound without the presence of boron trifluoride. That is, the halogenated olefin and anhydrous hydrogen fluoride are brought together in a suitable vessel, the vessel closed and the mixture caused to react by heating the vessel to a suitable temperature. In the present invention, it is necessary to modify this procedure by including a suitable quantity of boron trifluoride in the reaction vessel. This may be accomplished by passing gaseous boron trifluoride into the vessel, which has already been supplied with the halogenated olefin and the anhydrous hydrogen fluoride, through a needle valve included in the reaction vessel. An alternative procedure is to first dissolve the boron trifluoride in the anhydrous hydrogen fluoride and then add the solution to the reaction vessel in the manner employed when HF alone is being used.

Under the conditions described above, one atom of hydrogen and one atom of fluorine are added to the double bond of the olefinic compound. The position occupied by the added atom of fluorine in the reaction product is determined by the nature of the original olefinic compound and the operating experimental conditions. I have found that, when using a halogenated acyclic olefin previously shown to give no addition compound with anhydrous hydrogen fluoride alone, and mixing it with anhydrous hydrogen fluoride and boron trifluoride, in such proportions that there is at least 0.5 mole of the olefinic compound and at least 1 mole of anhydrous hydrogen fluoride together with a quantity of boron trifluoride, varying from less than 0.5 gram to 25 grams, and causing the mixture to react in a closed vessel by causing the temperature to rise to, or above, 30° C., an atom of hydrogen and an atom of fluorine will be added across the double bond of the olefinic compound. By this method, I am able to prepare $CH_2Cl-CCl_2F$ in substantial yields from $CHCl=CCl_2$, $CH_2Cl-CHClF$ from $CHCl=CHCl$, $CHCl_2-CCl_2F$ from $CCl_2CCl_2$, $CF_3-CHCl-CCl_2F$ from $CF_3-CCl=CCl_2$ and $CF_3-CH_2-CClF_2$ from $CF_3-CH=CClF$. None of these addition reactions will occur using the olefin and anhydrous HF without boron trifluoride also present. When I react halogenated olefins, known to give an addition product with anhydrous hydrogen fluoride alone, with anhydrous hydrogen fluoride in the presence of boron trifluoride, the yield of the addition product is greater than that obtained with no boron trifluoride present. Thus, $CH_3-CCl=CHCl$ forms $CH_3-CClF-CH_2Cl$ more readily using a boron trifluoride catalyst than using anhydrous hydrogen fluoride alone. Still other compounds, heretofore difficult to obtain in a pure form or obtained by more costly methods, and compounds, heretofore unattainable by other existing methods, may be readily prepared by this method.

The halogenated acyclic olefins which may be treated in accordance with my invention, include primarily those that contain chlorine, bromine and/or fluorine, that is, chloro-olefins, chloro-fluoro - olefins, fluoro - olefins, bromo - olefins, bromo-fluoro-olefins, bromo-chloro-olefins and bromo-chloro-fluoro-olefins. Such terms are employed in their ordinarily understood sense. For example, a chloro-olefin is an olefin in which at least one hydrogen atom has been substituted by chlorine, and a chloro - fluoro - olefin is an olefin in which at least one hydrogen atom has been replaced by chlorine and one other hydrogen replaced by fluorine. My invention is particularly concerned with the treatment of acyclic olefins in which more than one of the hydrogen atoms has been replaced by halogen, and those halogenated olefins which add HF with difficulty or not at all when treated with HF without a boron trifluoride catalyst. The following is a partial list of compounds which have been treated successfully in accordance with my invention.

$$CHCl=CHCl$$
$$CHCl=CCl_2$$
$$CCl_2=CCl_2$$
$$CH_3—CCl=CHCl$$
$$CF_3—CH=CClF$$
$$CF_3—CCl=CCl_2$$
$$CH_3—CH=CHCl$$

The halogenated olefin is placed in the reaction vessel and anhydrous hydrogen fluoride added in the proportion of at least one mole of HF to every 0.5 mole of the olefin. Increased quantities of HF may be used but usually without advantage. The boron trifluoride is then pumped into the vessel through a needle valve in the system. The amount of boron trifluoride which is to be used in order that the addition product is formed in the maximum yield depends upon the particular halogenated olefin being treated and the experimental conditions, such as, time of reaction and the temperature at which the reaction is to be carried out. Optimum experimental conditions must be determined with each halogenated olefin treated. Table I shows the effect of various experimental conditions on the addition of HF to $CHCl=CCl_2$ using $BF_3$. All the runs were made using a one mole quantity of the olefin.

TABLE I

| Temperature | $BF_3$ | Time | Conversion | Yield | Low Boiling |
|---|---|---|---|---|---|
| Deg. C. | Grams | Hours | Per cent | Per cent | Per cent |
| 60 | 12 | 24 | 16.5 | 48.5 | none |
| 95 | 3 | 12 | 15.0 | 48.0 | 3.0 |
| 95 | 6 | 3 | 18.0 | 51.5 | 2.2 |
| 95 | 6 | 12 | 33.0 | 51.2 | 9.0 |
| 95 | 12 | 1 | 15.0 | 52.0 | 2.0 |
| 95 | 12 | 3 | 19.0 | 51.5 | 3.0 |
| 95 | 12 | 12 | 42.0 | 58.0 | 10.0 |
| 95 | 12 | 24 | 56.5 | 66.5 | 9.0 |
| 95 | 24 | 3 | 36.1 | 65.0 | 2.0 |
| 120 | 24 | 20 | 34.4 | 34.4 | 21.5 |

NOTE.—Per cent conversion refers to the ratio of the quantity of fluorine addition product actually isolated to the quantity of organic material originally used; per cent yield is computed after subtracting the amount of recovered olefin from the quantity originally used; per cent low boiling refers to the quantity of difluoride formed in the reaction.

I have found that some halogenated olefins give the best yield of the addition product when very small amounts of boron trifluoride, about 1 gram per mole of olefin, is used while other halogenated olefins give the best yield of addition product when large amounts of boron trifluoride are used, about 24 grams of $BF_3$ per mole of olefin. It is necessary to use small amounts of $BF_3$ with certain halogenated olefins because increased amounts will cause the olefin to polymerize rather than undergo the desired addition reaction.

The reaction vessel should be one which will withstand high pressures and may be constructed of any metal which does not readily react with hydrogen fluoride. Suitable metals are silver, iron, nickel Inconel and platinum. The vessel will usually be provided with a pressure gauge and an opening fitted with a needle valve.

The manner in which the ingredients are put into the reaction vessel is of little importance. A suitable method is to cool the reaction vessel to 0° C., or lower, and add the halogenated olefin and the anhydrous hydrogen fluoride. The vessel is then closed at all openings except the needle valve. The boron trifluoride is then pumped into the vessel through the needle valve which is closed immediately upon the complete addition of the $BF_3$. An alternative method, sometimes employed, is to make a solution of $BF_3$ in HF and add the solution to the olefin contained in a pre-cooled reaction vessel.

After the ingredients are mixed and the vessel is closed, the temperature of the mixture is caused to rise to that at which the reaction proceeds rapidly. The optimum reaction temperatures will vary between about 30° C. and about 160° C. Most often, they lie between 60° C. and 120° C. The heating may be accomplished by placing the reaction vessel in warm water, a steam jacket, or placing the vessel in an electric heating unit. It is usually necessary to maintain such temperature for a substantial period of time so as to complete the reaction as far as possible.

In order to more clearly illustrate my invention, the following examples are given:

*Example I*

One mole of $CHCl=CCl_2$ (131.5 grams) was placed in an 800 cc. autoclave. The autoclave was cooled to about —30° C. and 40 grams of liquid HF added. The "head" of the reaction vessel, containing a pressure gauge and a needle valve, was then fastened in place. The autoclave was then connected to a cylinder of $BF_3$ by means of a ¼″ copper tube leading from the $BF_3$ cylinder to the needle valve in the autoclave. $BF_3$ was then pumped into the bomb until the pressure on the gauge reached a value previously found to be equivalent to 12 grams of $BF_3$. The needle valve was closed and the autoclave heated for 24 hours at 95° C. The autoclave was then cooled in ice water, opened and the contents poured over cracked ice. The mixture was neutralized with a caustic solution and the organic material separated by steam distillation. The crude halide was dried over $CaCl_2$ and finally fractionally distilled. The product and the starting material distill together in a fraction 85°–88° and it is necessary to destroy the olefin with a permanganate solution to obtain the pure product. $CH_2Cl—CCl_2F$ was thus obtained in an amount equal to 56.5% of the theoretical. A low boiling fraction of difluorinated material was also obtained equal to 9.0% of the theoretical quantity. The total organic recovery was 82%.

*Example II*

$CF_3—CH=CClF$ in a quantity of 0.45 mole (67 grams) was placed in an autoclave. The vessel was cooled to —78° C. and a solution of about 0.5 gram of $BF_3$ in 20 grams of HF was added in the liquid phase. The autoclave was closed and heated for 24 hours at 95° C. The reaction mixture was then distilled off and the vapors passed through a water scrubber, then through a CaCl₂ drier and finally condensed in a trap cooled in Dry-Ice acetone. This condensate was then fractionally distilled. The conversion to $CF_3-CH_2-CClF_2$ was about 65%. In this case, the product could be separated from the starting material directly by distillation since it boiled at about 23° C., while the olefin boiled at about 18° C.

Table II lists several other halogenated olefins which I have treated in a manner similar to Example I.

TABLE II

| Olefin | Grams BF₃ | Grams HF | Reaction Product | Per Cent Conv. |
|---|---|---|---|---|
| CHCl=CHCl | 12 | 40 | CH₂Cl—CHClF | 25.5 |
| CH₃—CCl=CHCl | 2 | 40 | CH₃—CClF—CH₂Cl and CH₃—CF₂—CH₂Cl | 35.0 4.4 |
| CCl₂=CCl₂ | 24 | 40 | CHCl₂—CCl₂F | 12.3 |
| CF₃—CCl=CCl₂ | 24 | 40 | CF₃—CHCl—CCl₂F | 12.0 |
| CHCl=CHCl | 3 | 40 | CH₂Cl—CHClF | 9.5 |
| CHCl=CHCl | 6 | 40 | CH₂Cl—CHClF | 21.4 |
| CCl₂=CCl₂ | 10 | 40 | CHCl₂—CCl₂F | 6.4 |
| CF₃—CCl=CCl₂ | 10 | 40 | CF₃—CHCl—CCl₂F | 8.0 |
| CF₃—CH=CClF | 3 | 40 | CF₃—CH₂—CClF₂ | 70.0 |

Note.—All runs listed in Table II were made using 1 mole of the olefinic compound.

It will be understood that the preceding examples are given for illustrative purposes only and that I do not intend to restrict my invention to the specific embodiments disclosed therein, but intend to cover my invention broadly as in the appended claims. Many variations and modifications may be made in the process without departing from the spirit or scope of my invention.

This invention provides a novel method of preparing organic fluorine compounds. With the sole exception of $CH_3-CCl=CHCl$, none of the halogenated olefins listed in the tables of this specification will give an addition product with HF alone under any known experimental procedure. The presence of BF₃ is essential to cause the addition product to form. In the case of $CH_3-CCl=CHCl$ and other such halogenated olefins, the presence of BF₃ in the reaction mixture will greatly increase the yield of the addition product.

I claim:

1. In a process for reacting hydrogen fluoride with a difficultly hydrofluorinated acyclic olefin in which olefin at least one halogen atom is attached to the olefinically-linked carbon atoms, the step of heating a mixture of such halogenated acyclic olefin, hydrogen fluoride and a reaction-promoting amount of boron trifluoride to a temperature between about 30 and about 160° C. till the reaction proceeds rapidly.

2. The invention as claimed in claim 1, wherein the halogenated acyclic olefin is an acyclic chloro-olefin containing at least three halogen atoms linked to the olefinically-bound carbon atoms.

3. The invention as claimed in claim 1 wherein the halogenated acyclic olefin is an acyclic chloro-fluoro-olefin.

4. The invention as defined by claim 1 in which the halogenated acyclic olefin has at least two halogen atoms attached to the olefinically-bound carbon atom pairs.

5. In a process for producing the hydrofluorination product of an acyclic olefin which has at least two halogen atoms attached to each olefinically-bound pair of carbon atoms and which is difficult to hydrofluorinate, the step of heating to a temperature between about 30 and 160° C., for a period of from about 1 to about 24 hours, an anhydrous mixture at superatmospheric pressure of such an olefin with at least about two molecular proportions of hydrogen fluoride and, as a reaction-promoter, from about 1 to about 50 grams of boron trifluoride per mol of olefin.

6. The invention as claimed in claim 5, wherein the halogenated acyclic olefin is an acyclic chloro-olefin containing at least three halogen atoms linked to the olefinically-bound carbon atoms.

7. The invention as claimed in claim 5, wherein the halogenated acyclic olefin is an acyclic chloro-fluoro-olefin.

8. A process of preparing $CH_2Cl-CCl_2F$, which comprises heating to a temperature between about 60 and about 120° C. for about 1 to about 24 hours and at superatmospheric pressure, a mixture of $CHCl=CCl_2$, at least two molecular proportions of anhydrous hydrogen fluoride and a reaction-promoting amount of from about 1 to about 24 grams of boron trifluoride per mole of $CHCl=CCl_2$ present.

9. A process of preparing $CF_3-CH_2-CClF_2$, which comprises heating to a temperature between about 60 and about 120° C. for about 1 to about 24 hours a compressed mixture of $CF_3-CH=CClF$, at least two molecular proportions of anhydrous hydrogen fluoride and a reaction-promoting amount of from about 1 to about 24 grams of boron trifluoride per mole of $CF_3-CH=CClF$ present.

ROBERT CHARLES ARNOLD.

REFERENCES CITED

The following references are of record in the file of this patent:

UNITED STATES PATENTS

| Number | Name | Date |
|---|---|---|
| 1,996,115 | Lazier | Apr. 2, 1935 |
| 2,118,901 | Soll | May 31, 1938 |
| 2,364,818 | Renoll | Dec. 12, 1944 |
| 2,399,024 | Harmon | Apr. 23, 1946 |
| 2,425,991 | Burk et. al. | Aug. 19, 1947 |
| 2,462,359 | Calfee et al. | Feb. 22, 1949 |

OTHER REFERENCES

Henne et al.: Jour. Am. Chem. Soc., vol. 64, 1157–9, (1942).

Henne et al.: Jour. Am. Chem. Soc., vol. 65, 1271–2 (1943).

Henne et al.: Jour. Am. Chem. Soc., vol. 63, 2692–4 (1941).

Grosse et al.: Jour. Org. Chem., vol. 3, 26–32 (1938).